United States Patent [19]

Kwak

[11] Patent Number: 5,270,761
[45] Date of Patent: Dec. 14, 1993

[54] CAMERA ASSEMBLY

[75] Inventor: Debby H. Kwak, Cerritos, Calif.

[73] Assignee: Eastman Kodak Company, Rochester, N.Y.

[21] Appl. No.: 895,758

[22] Filed: Jun. 9, 1992

[51] Int. Cl.⁵ .............................................. G03B 17/02
[52] U.S. Cl. .................................................... 354/288
[58] Field of Search ............................... 354/288, 266

[56] References Cited

U.S. PATENT DOCUMENTS

| | | | |
|---|---|---|---|
| 3,048,092 | 8/1962 | Gottschalk | 95/45 |
| 4,221,477 | 9/1980 | Prochnow et al. | 354/82 |
| 4,483,601 | 11/1984 | Sekida et al. | 354/288 |
| 5,115,265 | 5/1992 | Swayze | 354/82 |

Primary Examiner—Michael L. Gellner
Assistant Examiner—Nicholas J. Tuccillo
Attorney, Agent, or Firm—Roger A. Fields

[57] ABSTRACT

A camera body has a pair of right-hand and left-hand symmetric openings for alternatively receiving a manually actuated camera device, such as a shutter release, thereby allowing the camera body to be tailored selectively for right-hand or left-hand use of the manually actuated camera device.

2 Claims, 3 Drawing Sheets

CAMERA ASSEMBLY

CROSS-REFERENCE TO A RELATED APPLICATION

Reference is made to commonly assigned copending application Ser. No. 07/895,756, entitled SHUTTER RELEASE, and filed Jun. 9, 1992 in the name of Debby Hyun-Jin Kwak.

BACKGROUND OF THE INVENTION

1. Field of the Invention

The invention relates generally to the field of photography, and in particular to a camera assembly.

2. Description of the Prior Art

The vast majority of photographic cameras are intended for right-hand use, in that the shutter release is located proximate right-hand end portion of the camera body. This can make camera operation somewhat uncomfortable for a left-handed user.

SUMMARY OF THE INVENTION

A camera body has a pair of right-hand and left-hand symmetric openings for alternatively receiving a manually actuated camera device, such as a shutter release, thereby allowing the camera body to be tailored selectively for right-hand or left-hand use of the manually actuated camera device.

DETAILED DESCRIPTION OF THE PREFERRED EMBODIMENT

The invention is disclosed as being embodied in a compact 35 mm camera. Because such photographic cameras have become well known, this description is directed in particular to camera elements forming part of or cooperating directly with the preferred embodiment. It is to be understood, however, that camera elements not specifically shown or described may take various forms known to persons of ordinary skill in the art.

Figure 1:
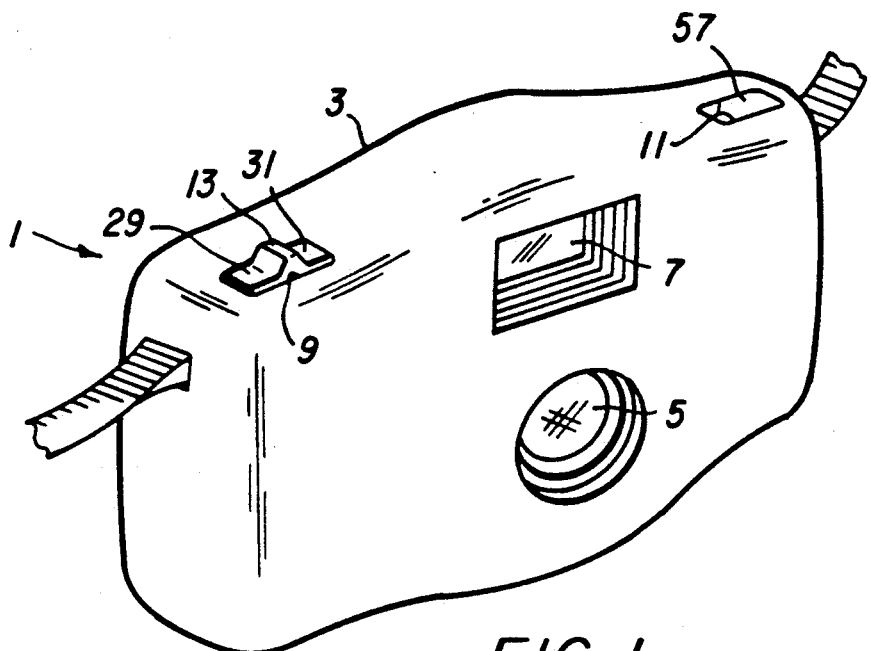
FIG. 1 is a front top perspective view of a photographic camera, according to a preferred embodiment of the invention;.
Figure 2A:
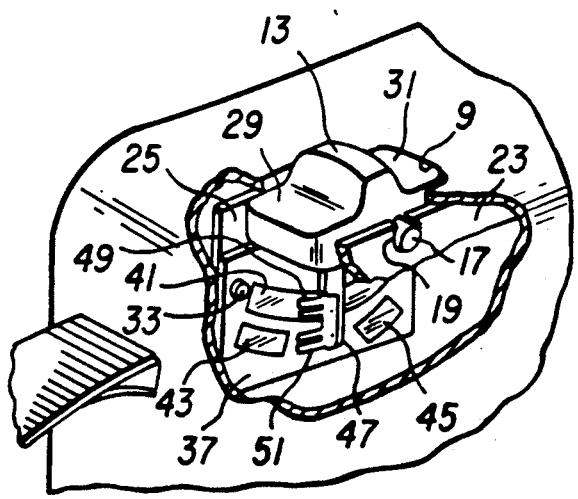
FIGS. 2A and 2B are front top perspective views of only parts of the camera body, showing a pair of right-hand and left-hand symmetric openings respectively, one of which is capped and the other of which has a bi-directional shutter release supported in it.
Figure 2B:
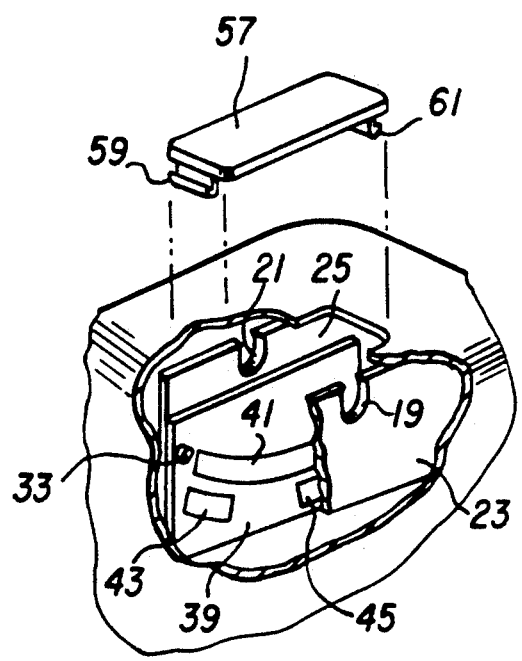
Figure 3:
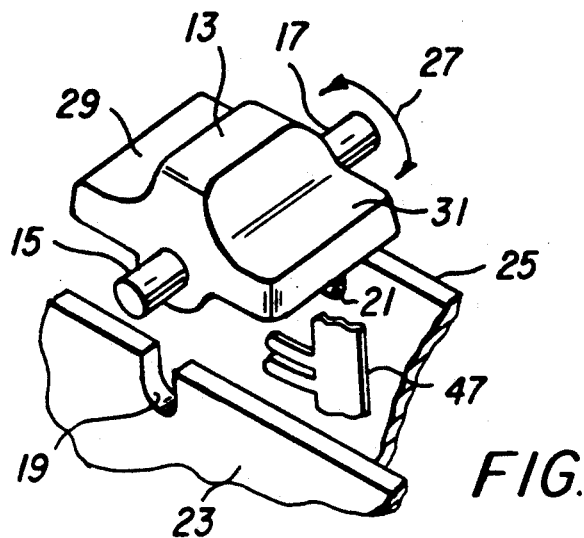
FIG. 3 is a detailed perspective view of the shutter release depicted in FIG. 2A.
Figure 4:
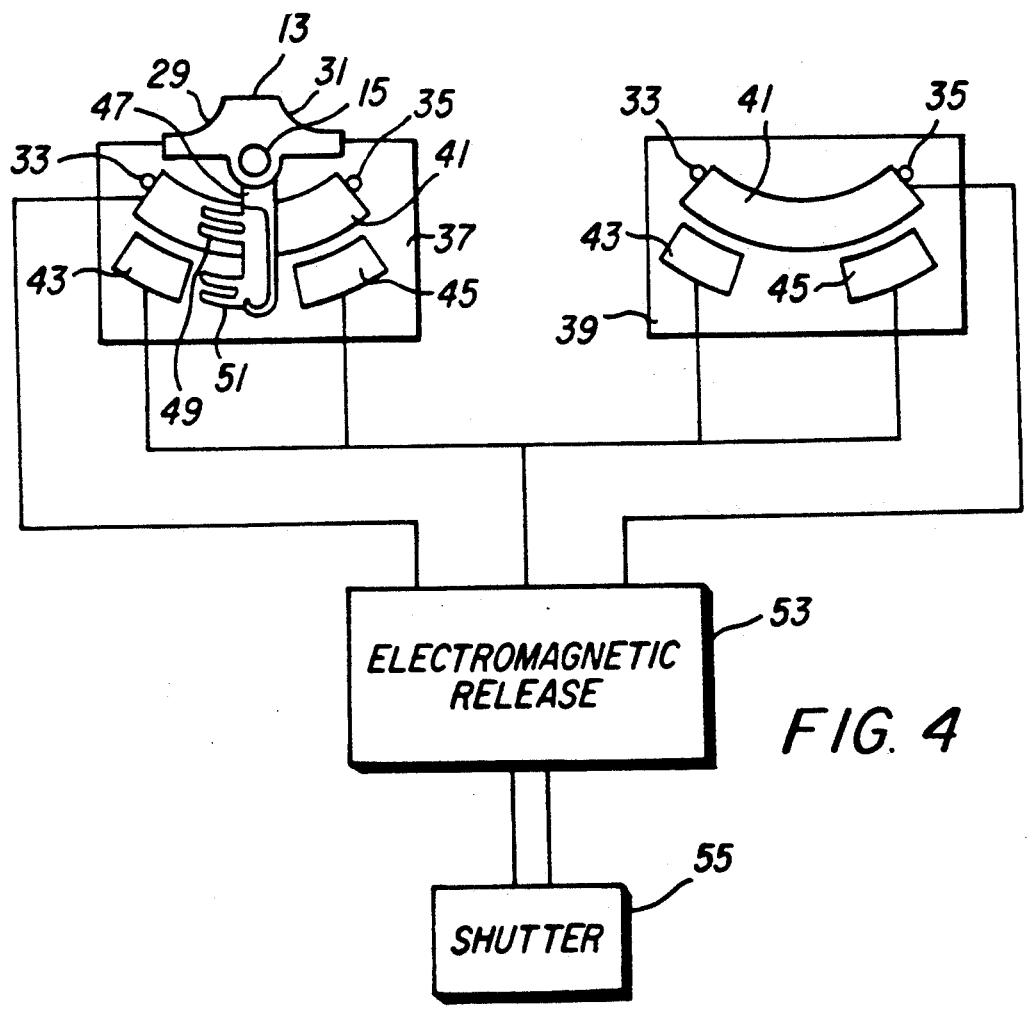
FIG. 4 is a schematic view of electrical circuitry to be used with the shutter release depicted in FIG. 2A.

Referring now to the drawings, FIG. 1 shows a photographic camera 1 comprising a camera body 3, a known taking lens 5, and a known viewfinder 7. As can be seen in FIGS. 2A and 2B, the camera body 3 has a pair of right-hand and left-hand symmetric openings 9 and 11 for alternatively receiving a manually actuable shutter release in the form of a finger button 13. Preferably, the finger button 13 has two integrally formed coaxial pivot pins 15 and 17 centrally located with respect to opposite ends of the button. See FIG. 3. A pair of grooves 19 and 21 are formed in respective ribs 23 and 25 fixed within the camera body 3, proximate each of the right- and left-hand openings 9 and 11. The pivot pins 15 and 17 are snap-fitted into the grooves 19 and 21 at either one of the right- and left-hand openings 9 and 11 to support the finger button 13 for pivotal movement bi-directionally, i.e. in opposite directions as indicated by the double-headed arrow 27 in FIG. 3. A pair of symmetric surfaces 29 and 31 are formed on the finger button 13, to be manually gripped to pivot the button from an illustrated intermediate or non-operative position selectively to alternative terminal or operative positions against respective stops 33 and 35. The stops 33 and 35 protrude from identical switch bases 37 and 39 secured to the camera body 3 inwardly of the right- and left-hand openings 9 and 11. See FIGS. 2 and 4. A return spring, not shown, may be provided to bias the finger button 13 to its intermediate position from either one of its terminal positions.

Each of the switch bases 37 and 39 supports a single metallic-ribbon contact 41 and a pair of spaced metallic-ribbon contacts 43 and 45. An arm 47 projecting from the finger button 13 includes a metallic brush 49 that is continuously in engagement with the single contact 41 and a metallic brush 51 that is moved into engagement with the contact 43 or 45 in accordance with whichever one of the terminal positions the button is pivoted to from its intermediate position. The two brushes 49 and 51 are integrally formed. The contacts 41, 43 and 45 are connected to a known electromagnetic release 53 for a known camera shutter 55. When the finger button 13 is pivoted to either one of its terminal positions, the contacts 41 and 43 or the contacts 41 and 45 are electrically connected via the brushes 49 and 51 to cause the electromagnetic release 53 to be activated to, in turn, momentarily open the camera shutter 55 to make an exposure.

A cap 57 has two prongs 59 and 61 that secure the cap to the camera body 3, over whichever one of the right- and left-hand openings 9 and 11 that does not include the finger button 13. See FIGS. 1 and 2B.

Figure 5:
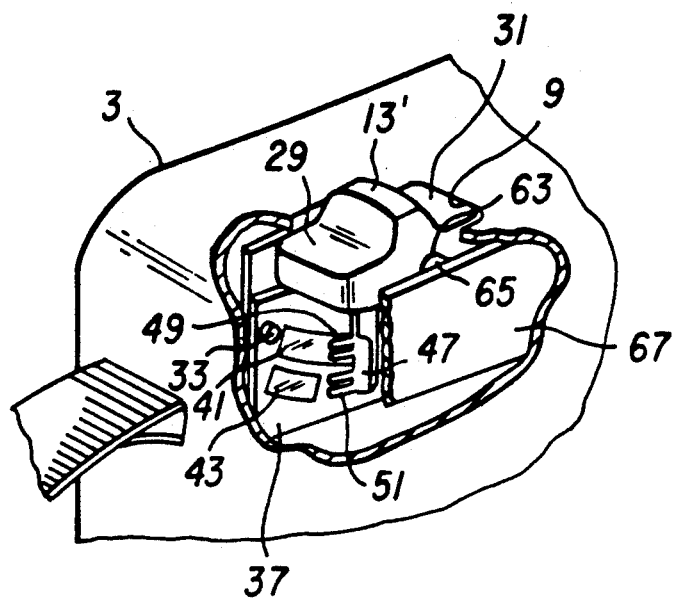
FIG. 5 is a front top perspective view of only part of the camera body, showing a shutter release which is an alternate version of the one depicted in FIG. 2A.
Figure 6:
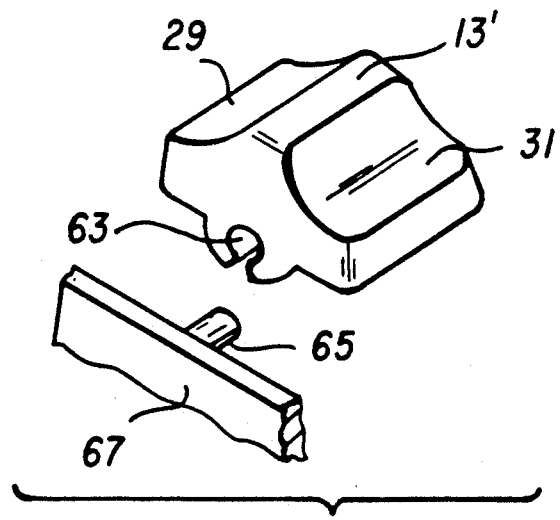
FIG. 6 is a detailed perspective view of the shutter release depicted in FIG. 5.

FIGS. 5 and 6 show a variation 13' of the finger button 13. In lieu of the coaxial pivot pins 15 and 17, the variation 13' has a coaxial hole 63 for receiving two aligned pins 65, only one shows, that project from respective ribs 67 and 69 similar to the ribs 23 and 25.

The invention has been described with reference to a preferred embodiment. However, it will be appreciated that various modifications can be effected within the ordinary skill in the art without departing from the scope of the invention.

I claim:

1. A camera assembly comprising:

a camera body;

means defining a right-hand opening in said camera body having certain dimensions which allow said right-hand opening to receive a manually actuated camera device;

means defining a left-hand opening in said camera body having the same dimensions as said right-hand opening to allow said left-hand opening to receive the manually actuated camera device in place of the right-hand opening receiving it;

a manually actuated camera device received in only one of said right-hand and left-hand openings to leave the remaining one of the openings empty; and a cover for sealing whichever one of said right-hand and left-hand openings is empty, whereby said camera body can be tailored selectively for right- hand or left-hand use of the manually actuated camera device.

2. A camera assembly as recited in claim 1, wherein said right-hand opening and said left-hand opening are located symmetrically with respect to each other.

* * * * *